United States Patent [19]
Beard

[11] Patent Number: 4,705,371
[45] Date of Patent: Nov. 10, 1987

[54] 3-D METHOD AND APPARATUS

[76] Inventor: Terry D. Beard, 1407 North View Dr., Westlake Village, Calif. 91362

[21] Appl. No.: 916,136

[22] Filed: Oct. 10, 1986

[51] Int. Cl.$^4$ ........................................... G03B 21/32
[52] U.S. Cl. ..................................... 352/86; 350/133
[58] Field of Search ...................... 352/43, 57, 58, 69, 352/86; 350/130, 132, 133, 144, 407; 351/49; 358/3, 91, 92, 152; 354/76; 355/132

[56] References Cited

U.S. PATENT DOCUMENTS

| | | | |
|---|---|---|---|
| 2,688,900 | 9/1954 | Silverman | 351/49 |
| 2,996,949 | 8/1961 | LeRay | 352/60 |
| 3,256,776 | 6/1966 | Land et al. | 352/43 X |
| 3,275,745 | 9/1966 | Var | 358/152 X |
| 3,432,220 | 3/1969 | Schreiner | 350/132 |
| 3,598,032 | 8/1971 | Bohn | 358/92 X |
| 3,697,675 | 10/1972 | Beard et al. | 358/3 X |
| 3,712,199 | 1/1973 | Songer, Jr. | 352/60 X |
| 3,785,720 | 1/1974 | Kyryluk | 350/144 |
| 4,131,342 | 12/1978 | Dudley | 352/43 |

OTHER PUBLICATIONS

Lit, "Magnitude of the Pulfrich Stereophenomenon as a Function of Target Thickness", Journal of the Optical Society of America, pp. 321–327, Apr. 1960, vol. 50, No. 4.

Primary Examiner—L. T. Hix
Assistant Examiner—Brian W. Brown
Attorney, Agent, or Firm—Koppel & Harris

[57] ABSTRACT

A method for creating a 3-D effect is disclosed in which a scene is recorded with a relative lateral movemnet between the scene and the recording mechanism. The recording is played back and viewed through a light filter which has a greater optical density for one eye than for the other eye, thereby causing one eye to perceive a darker image which appears to lag in time behind the image perceived by the other eye. The result is a three-dimensional effect which can be controlled by controlling the direction and speed of relative movement, the relative optical densities of the filter used for each eye, and the size of the distance from the viewing screen. The invention also includes viewer glasses with a spectral density gradient in which the optical density of one lens is at least 0.3 optical density darker than the optical density of the other lens, and the differene in optical densities between the two lenses is preferably within the range of approximately 0.8 to approximately 2.0.

24 Claims, 9 Drawing Figures

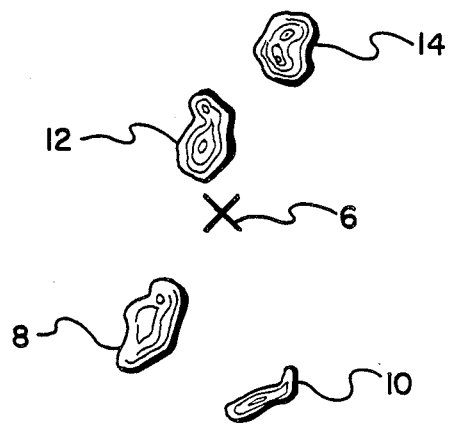
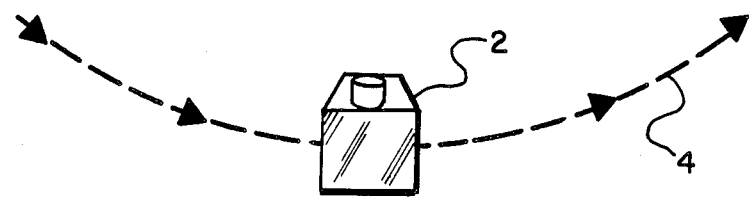
Fig.1.
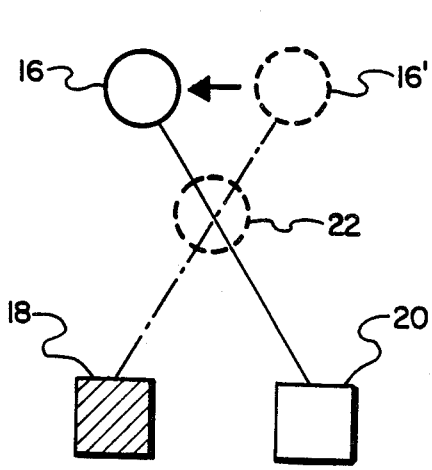 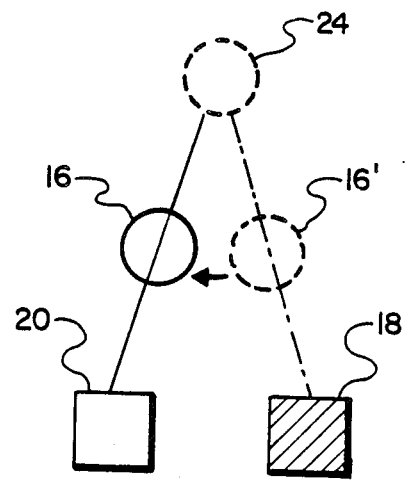
Fig.2. Fig.3.

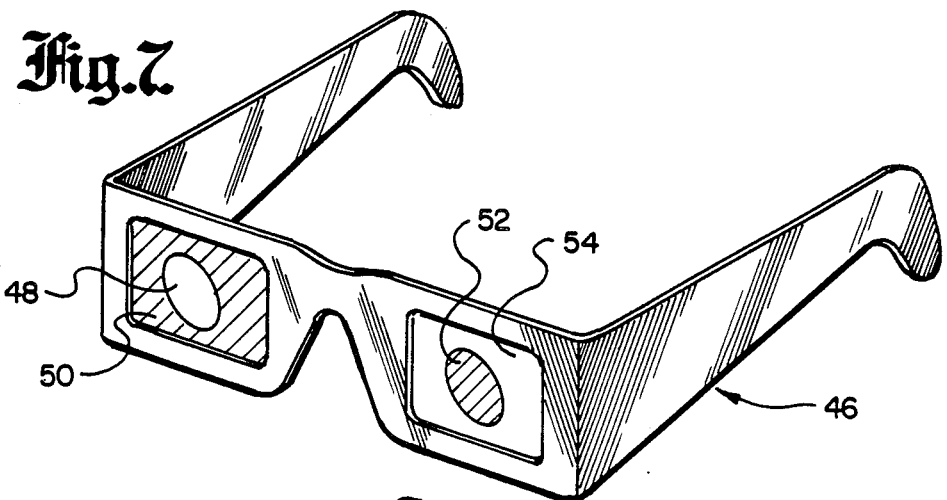
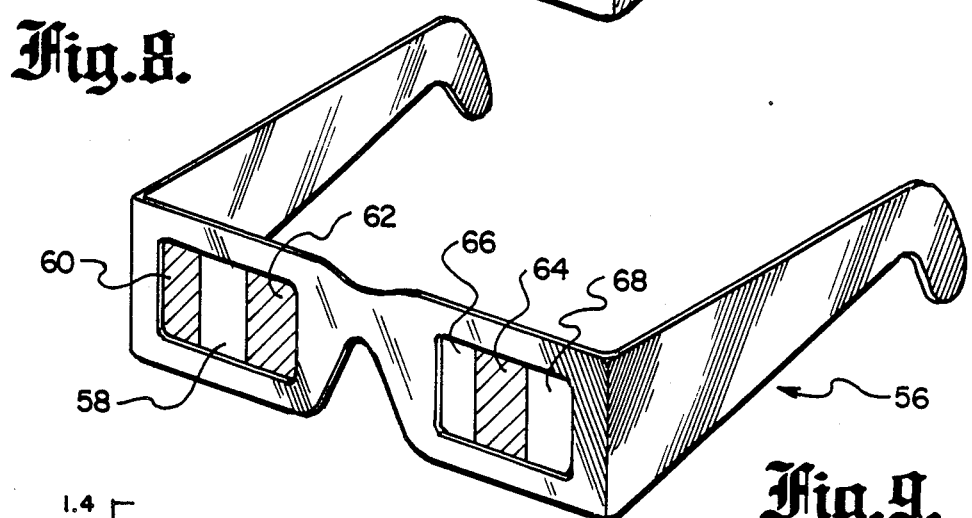
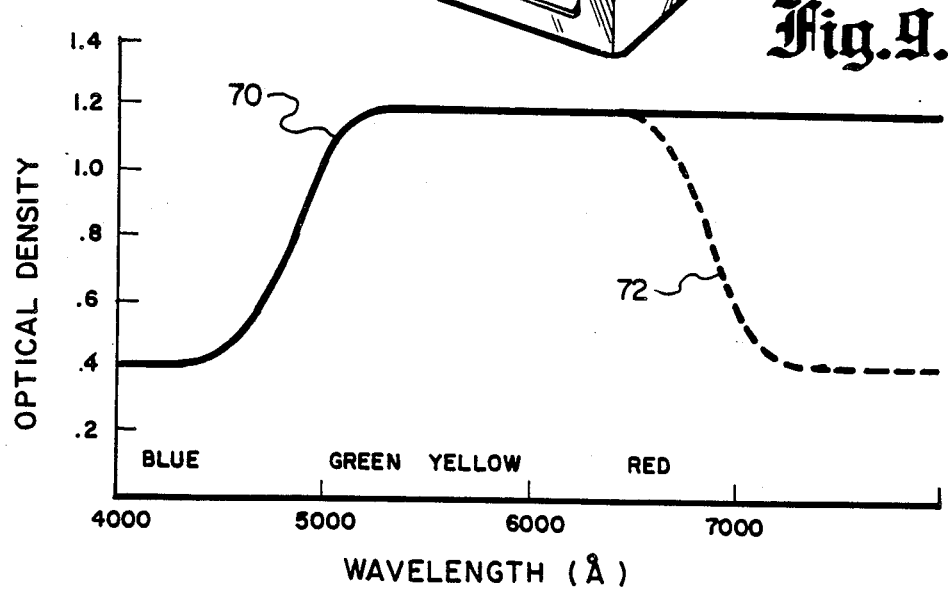

3-D METHOD AND APPARATUS

BACKGROUND OF THE INVENTION

1. Field of the Invention

This invention relates to the production of three-dimensional images for television, motion pictures, video games and the like.

2. Description of the Prior Art

Various techniques have been used in the past to produce stereoscopic (three-dimensional) images for motion pictures or television. In general, these techniques involve two camera systems in which two different pictures are taken from slightly different camera angles and locations. The object is to simulate the manner in which depth is perceived by a pair of human eyes, which are themselves slightly offset from each other and thus view images at slightly different angles. The two camera images are superimposed and presented to the viewer simultaneously on a television or movie screen. The images are then separated in some fashion for the viewer so that one eye sees only one image, and the other eye sees only the other image. In this way an illusion of depth is created by simulating normal vision.

One technique which has been used to implement this approach is called the anaglyphic 3-D process, and has been employed in motion pictures and television. This technique uses color filters to separate the two images. The images are color coded, for example with red and green respectively, and the viewer is provided with glasses having different colored filters in front of each eye. Each filter rejects the image that is not intended for that eye, and transmits the image which is intended to be seen by that eye. A red color filter will pass only the red image, while a green color filter will pass only the green image. If the left eye image is presented as a green image and the right as a red image, and a green filter is placed in front of the left eye and a red filter in front of the right eye, the proper images will be directed to the proper eye and a 3-D image will be perceived by the viewer. An example of the anaglyphic process is disclosed in U.S. Pat. No. 3,697,679, entitled "Stereoscopic Television System", by the present inventor Terry D. Beard together with Eric R. Garen. A major shortcoming of the anaglyphic method is that the color filters interfere with the presentation of a high quality full color image. Color filters which fully reject the undesired image are difficult to make, with the result that the 3-D effect is impaired. This process is also difficult to use successfully in television because of the limited bandwidth transmission of color information in commercial broadcasts. The result of this limited bandwidth transmission is either ghost image interference or low resolution images.

Another 3-D process used in motion pictures is the so-called "Polaroid" process, in which the left and right eye images are separated by the use of polarizing light filters. The left eye image is projected onto the screen through a polarizing filter rotated 45° to the left of vertical, while the right eye image is projected onto the screen through a polarizing filter rotated 45° to the right of vertical. In this way the polarization of the two images are at right angles, and similarly polarized filters placed in front of each of the viewer's eyes will cause the proper image to be transmitted to each eye. This method is not adapted for 3-D television, and its use for motion pictures requires a special non-depolarizing projection screen.

Another technique which has been used to produce 3-D images on television involves the sequential presentation of left and right eye images to the viewer, together with the use of synchronized electro-optical glasses to switch on the filter in front of each eye when its image is being presented. This process is complicated and expensive, and requires special broadcasting and receiving equipment and electro-optical glasses.

SUMMARY OF THE INVENTION

These and other problems associated with the prior art are overcome by the present invention, the object of which is to provide a simple and effective 3-D method and apparatus which is applicable to conventional color or black and white television, can be projected onto a standard motion picture screen by a single projector, and can be used in conjunction with video games and the like to provide a high quality 3-D effect.

A further object of the invention is the provision of a 3-D method and apparatus which provides a high quality 3-D image in full color with no ghost images, which requires only a single standard camera to shoot, and which uses inexpensive 3-D glasses.

To realize these objects, a moving picture of a scene is recorded with a recording mechanism such as a standard movie camera, television camera or video game. The scene is recorded such that a relative lateral movement is created between the scene and the recording mechanism. The lateral movement can result from movement within the scene itself, or by moving the camera in various ways. The recorded scene is then viewed through a light filter which has a greater optical density for one eye than for the other eye, whereby one eye perceives a darker image than the other. When viewed in this manner, a realistic 3-D effect is created.

The viewer glasses have left and right eye lenses in which the optical density of one lens is at least 0.3 darker than the optical density of the other lens, the difference in optical density between the two lenses preferably being within the range of approximately 0.8 to approximately 2.0. The darker lens has a density gradient which has been discovered to enhance the 3-D effect. Specifically, the density of the lens is substantially less in the blue region than in the remainder of the visible spectrum. The optical density may in addition be reduced in the red region for improved results.

According to another feature of the invention, a differential optical density is established between the peripheral and the central portions of the lenses to enhance viewer comfort.

These and other objects and features of the invention will be apparent to those skilled in the art from the following detailed description of preferred embodiments, taken together with the accompanying drawings, in which:

DESCRIPTION OF THE DRAWINGS

FIG. 1 is an illustration of a camera taking a moving picture in accordance with the invention;

FIGS. 2 and 3 are illustrations of the effect of lateral movement on the image seen by a viewer wearing viewer glasses constructed in accordance with the invention;

FIGS. 7 and 8 are perspective views of two types of viewer glasses constructed in accordance with the invention; and FIG. 9 is a graph showing the neutral density of the darker lens as a function of wavelength in a preferred form of the invention.

DETAILED DESCRIPTION OF THE PREFERRED EMBODIMENTS

Figure 4:
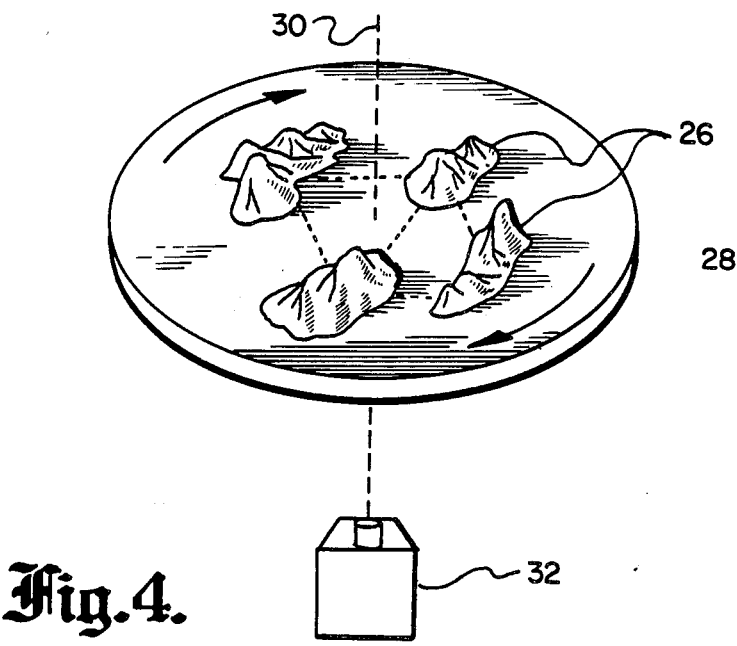
FIGS. 4-6 are illustrations of other techniques of taking moving pictures in accordance with the invention.

The present invention utilizes a known principle of vision referred to as the Pulfrich effect. According to this principle, the human eye interprets images differently depending upon the image brightness. This difference in processing is a complicated function of the human visual system, but the effective result is a delay in processing images of lesser brightness.

Applicant makes use of this effect to produce a stereoscopic system that completely eliminates the prior art requirement for duplicate cameras and separation of images. The invention operates on the principle that, if a viewer is presented with a scene from a continuously moving point of reference and one eye looks at the image through a filter that causes the image to appear darker than that seen by the other eye, the effect is to delay the processing of the image seen by the eye which looks through the darker filter. This causes that eye to "see" the image as it was a short period of time before the lighter image perceived by the other eye. The result is the creation of a dramatic and entirely real three-dimensional effect.

The duration of the image delay has been found to be related to both the difference in absolute optical densities of the left and right eye filters, and also to the optical density of the darker filters as a function of electromagnetic wavelength. "Optical density" has an inverse logarithmic relationship to transmissivity; an optical density of 0 corresponds to 100% transmission, while an optical density of 1.0 corresponds to 10% transmission. The optical density of the darker filter should be at least 0.3 darker than that of the lighter filter. A difference in the overall optical density between the two filters of between approximately 0.8 and approximately 2.0 has been found to produce best results, but somewhat lesser differentials will also work. In one example in which good performance was obtained, a clear lens was used for the lower density lens, with the other lens having an optical density of 1.4.

To obtain a three-dimensional effect using this process, there should be a relative lateral movement between the camera and the scene. This produces a movement from one viewer lens to the other when the image is seen through appropriate viewer glasses. Either the camera or the objects in the scene, or both, should have continuous lateral movement. One preferred way of obtaining the desired movement is to rotate the camera about a fixed reference point. Referring to FIG. 1, a movie or video camera 2 is shown moving along an arc 4 which is centered on point 6, the camera being continuously directed toward point 6 as it moves along the arc. If the film or video tape is then played back and viewed through glasses which have a darker left eye filter and a lighter right eye filter, the scene will appear in 3-D with point 6 appearing to be at the screen level, objects 8 and 10 in their proper relative positions in front of the screen, and objects 12 and 14 in their proper relative positions behind the screen.

If the camera movement is now reversed from that shown in FIG. 1, so that it traverses from right to left, the images of the various objects when seen through the same viewer glasses will also be reversed with respect to reference point 6. That is, objects 8 and 10 will appear further away, behind the screen, while objects 12 and 14 will appear to be closer, in front of the screen. The explanation of this phenomenon is illustrated in FIGS. 2 and 3. In FIG. 2, an object 16 appearing on a movie or television screen or a video game is shown as having moved from an earlier position 16'. The object is viewed through a set of viewer glasses, the left and right lenses of which are represented by squares 18 and 20. Left lens 18 has a higher optical density (i.e., is darker) than right lens 20, and therefore causes the viewer to perceive the object through his left eye at location 16', whereas the object is perceived by the right eye at its actual location on the screen. The result is that the object appears to both eyes at the intersection of the lines between each lens and the respective image which it sees. This intersection occurs at location 22, which is in space in front of the screen.

If the lenses are now reversed so that the lighter lens 20 is on the left and the darker lens 18 on the right, the same object 16 moving in the same direction will appear behind the screen rather than in front. This is because the object 16 will be perceived through the left hand lens 20 at its real position, and through the right hand lens 18 at its previous position 16'. Lines drawn between each lens and their respective images intersect at location 24, behind the screen.

If the lenses were now to be returned to the positions shown in FIG. 2 but the direction of movement of object 16 reversed so that it now moves from left to right, the 3-D effect would be the same as in FIG. 3, that is, the object would be seen behind the screen. Thus, the relative lateral movement between the objects appearing on the screen and the two lenses of the viewer glasses determine the 3-D effect, and the depth perception can be reversed by reversing the relative direction of movement between the objects on the screen and the light and dark viewer lenses.

Referring now to FIG. 4, a set of objects 26 is shown rotating in a clockwise direction on turntable 28 about rotational axis 30, while being photographed by camera 32. The photographed objects will appear in proper depth perspective when viewed with glasses having a left eye filter lighter than the right eye filter.

The amount of depth perceived has been found to be a function of the lateral speed of the object relative to the camera, the difference in density between the two eye filters, the size of the viewing screen on which the image is presented to the viewer and the distance from the viewer to the screen. The amount of depth perceived is directly proportional to the size of the presentation screen and the distance from the screen. Thus, if the screen is twice as large or if one views the same presentation from twice as far away, the amount of depth perceived will be twice as great. If an image twice as large is viewed from twice as far away, the amount of depth perceived will be four times as great. The amount of depth perceived is also proportional to the rate of lateral movement. With the rotational arrangement of FIG. 4, depth perception increases with the speed of rotation up to a point at which the images are rotating so fast they cannot be clearly perceived. An upper limit on the rotational rate for good perception of the 3-D effect has been found to be about 30 revolutions per minute, with a typical useful rotational speed of about 10–20 revolutions per minute. An object rotating at 15 revolutions per minute when viewed from a distance of 8 feet on a 19" television screen through glasses having a 1.3 optical density difference between the left and right eye lenses has been found to result in substantially true 3-D perception, in which the 3-D depth is neither exaggerated nor compressed.

Figures 5, 6:
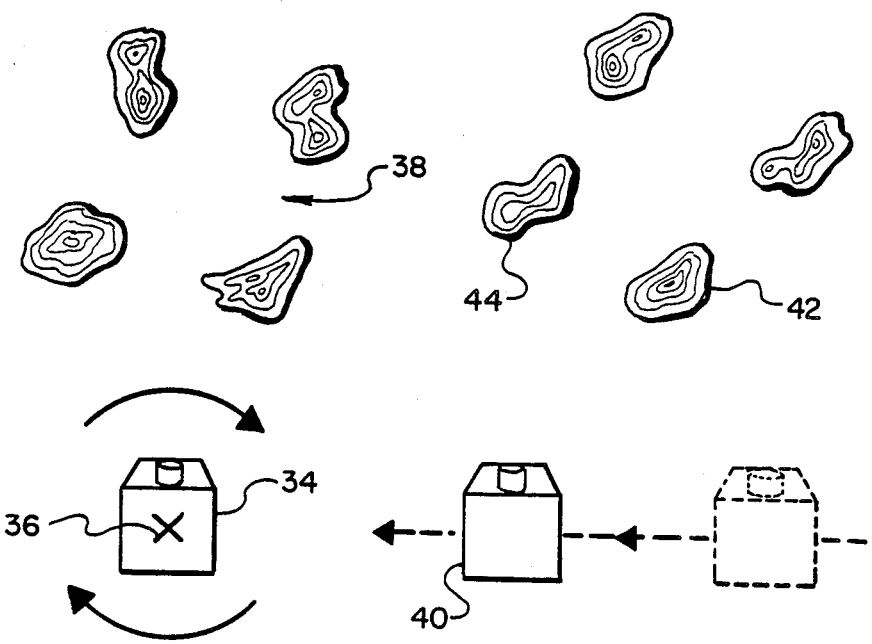

Another way of obtaining the required lateral movement between the scene and the camera is illustrated in FIG. 5, in which the camera 34 rotates about an internal axis 36. In this type of shot the depth effect is enhanced by having something in the field move with the camera pan. With glasses having the right lens darker than the left, objects or scenery 38 moving left to right across the projection screen will appear in front of the screen, while objects moving right to left will appear behind the screen. Thus, in FIG. 5 camera 34 panning in a clockwise direction when viewed from above will record the scene 38 in such a way that, when viewed with glasses with a darker right eye filter, the scene will appear behind the plane of the viewing screen.

In another example of camera technique, the center of camera rotation may be considered as being at infinity. In this case, illustrated in FIG. 6, the camera 40 moves laterally along a straight line while pointing continuously at an angle to its axis of movement toward an imaginary point infinitely far away. A scene recorded in this fashion, when viewed with glasses having the right lens darker than the left, will result in the point at infinity appearing at screen level. Everything else in the picture will appear in front of the screen, that is, between the screen and the viewer. Objects will appear in their proper depth relationship, with object 42 appearing closer to the viewer than object 44, and so on.

The above method for producing stereoscopic images can also be used in conjunction with computer generated images. Computers can create and manipulate images as though they were three-dimensional and rotate them in space or, alternatively, they can rotate the viewer's observation point in space according to the methods described above to create three-dimensional computer generated images.

Many times real world objects may not be moving in a direction or at a rate compatible with the creation of a good 3-D effect using the above process. This problem can be substantially alleviated by using computer image manipulation devices such as the Ampex ADO to flip the image and reverse the left and right images during portions of the recording to adjust the stereoscopic effect during such portions. A similar kind of processing may be used to increase or decrease the speed of rotation, scan or other relative lateral movement between the camera and the scene to bring the 3-D effect to the desired level.

The above 3-D technique can also be combined with prior art anaglyphic or polarized 3-D processes to enhance those processes. For example, in the alaglyphic process one of the color filters can be made substantially darker than the other. By shooting the scene in accordance with the principles disclosed herein, the overall 3-D effect can be greatly enhanced. The same effect can be achieved with the polarizing process by inserting an optical filter in front of one of the polarizing filters of the 3-D glasses and recording the scene using the techniques described herein.

It has been found that a large difference in the densities of the two lenses may be bothersome to the viewer. A way of reducing this problem is to darken the peripheral field of the lighter density lens, and lighten the peripheral field of the darker density lens. This may be accomplished by painting the frame of the light lens black and the frame of the dark lens white. Another and more effective means of accomplishing this end is illustrated in FIG. 7, which shows a pair of viewer glasses 46. The lighter lens has a relatively light central portion 48 and a relatively dark peripheral area 50, whereas the darker lens has a relatively dark central portion 52 and a lighter peripheral area 54. Since the viewer generally looks only through the center portions of the lenses, the oppositely shaded peripheral portions are generally outside of the viewer's direct field of vision.

An alternate embodiment for a pair of viewer glasses 56 is shown in FIG. 8. In this example the light lens is in the form of a light vertical strip 58 with darker vertical strips 60 and 62 on either side, while the dark lens is in the form of a dark vertical strip 64 with light vertical strips 66 and 68 on either side.

A significant improvement can be obtained in the overall 3-D effect and viewer comfort by providing the darker lens in the form of a spectral filter having a spectral density gradient which transmits substantially more light in the lower wavelength blue region of the optical spectrum than in the middle wavelength green-yellow region. The optical density in the blue region can be on the order of 3 or 4 times less than in the green-yellow region without materially degrading the color balance of the glasses. The exact reason for the improvement in overall performance with a blue-biased filter is not known with certainty, but it has previously been determined that the human eye is typically about six times less sensitive to blue than to green or yellow. It can be theorized that a higher blue transmission in the darker lens reduces the actual optical density imbalance between the two lenses, thus giving a more "natural" look to the scene when viewed through the glasses, while the eye's relative insensitivity to blue maintains the perceived density differential. With the blue tint a greater optical density differential can be employed between the two lenses, with a correspondingly greater 3-D effect, without inducing eye strain.

Further enhancement can be obtained by designing the darker lens to have a lower optical density in the red as well as the blue region of the spectrum, as compared to its optical density in the green-yellow region. It is believed that this improvement is related to the fact that the human eye is about 2 times less sensitive to red than to green or yellow.

FIG. 9 is a graph which illustrates the spectral transmission characteristics of a suitable dark filter. The optical density in the green-yellow region is about 1.2. The optical density falls in the blue region, below about 4,500 angstroms, to a level of about 0.4. The filter can have either a relatively steady high optical density level above the blue region, as indicated by solid line 70, or the optical density can fall off again in the red region, as indicated by dashed line 72. While there is a fairly wide permissable range of optical density differentials between green-yellow on the one hand and blue and/or red on the other hand, a ratio of about 1.5:1 or greater will produce noticeably better results.

The stereoscopic method described above can also be used to create special 3-D effects. The 3-D effects created can conflict with other visual information being presented, resulting in a scene which appears with a very unreal kind of depth, such as larger objects appearing further away rather than closer. This phenomenon can be very effective when used with computer generated art.

In addition to movies and television, the 3-D technique described herein can be used to create three-dimension video game effects. With the proper viewing glasses, an object's depth behind or in front of the screen can be controlled by controlling its direction and speed of travel across the screen. Its depth is directly proportional to its speed of movement, while the image position in front of or behind the screen depends on the object's direction of travel and the arrangement of the lenses in the viewer glasses.

A novel method and apparatus for stereoscopic viewing which requires no special camera equipment, and in which the image appears in full 3-D when viewed through proper glasses but as a perfectly normal two-dimensional image when viewed without the glasses, has been described. Many variations and alternate embodiments will occur to those skilled in the art. Accordingly, it is intended that the invention be limited only in terms of the appended claims.

I claim:

1. A method for creating a 3-D effect comprising:
   visually recording a moving picture of a scene with a relative lateral movement between the scene and the recording mechanism,
   playing back the visual recording, and
   viewing the visual recording during playback through a light filter which has a greater optical density for one eye than for the other eye, whereby said one eye perceives a darker image than the other eye, the light filter for said one eye having a spectral density gradient with a substantially higher transmissivity in the blue region than in the green or yellow regions.

2. The method of claim 1, wherein the recording mechanism is moved during recording along a generally circular arc with its field of view generally centered on the center of the arc.

3. The method of claim 1, wherein the recording mechanism is moved during recording in a generally straight line, and is directed at an angle to its motion path which is substantially greater than zero.

4. The method of claim 1, wherein the recording mechanism is rotated during recording about an internal axis.

5. The method of claim 1, wherein said method is used in combination with a conventional anaglyphic or polarizing stereoscopic method.

6. The method of claim 1, further comprising the step of reversing the left and right images on portions of the visual recording to adjust the stereoscopic effect during such portions.

7. The method of claim 1, further comprising the step of adjusting the speed of relative lateral motion between the scene and the recording mechanism during the portions of the visual recording to adjust the stereoscopic effect during such portions.

8. The method of claim 1, wherein the scene is rotated about an internal axis to produce said relative lateral movement.

9. The method of claim 1, wherein the light filter has an optical density for one eye which is at least 0.3 darker than the optical density for the other eye.

10. The method of claim 9, wherein the light filter's difference in optical density between the two eyes is within the range of approximately 0.8 to approximately 2.0.

11. The method of claim 1, wherein the ratio of the light filter's optical density for said one eye in the green-yellow region is within the range of about 1.5–4 times its optical density in the blue region.

12. The method of claim 1, wherein the light filter for said one eye has a substantially higher transmissivity in the red region than in the green or yellow regions.

13. The method of claim 1, wherein the visual recording is in the form of a videotape, motion picture, video game or the like.

14. Viewer glasses for creating a stereoscopic effect when viewing an ordinary moving picture produced by a videotape, motion picture, video game or the like, in which at least portions of the scene exhibit a lateral movement, comprising:
   first means for transmitting light from the moving picture to the viewer's right eye,
   second means for transmitting light from the moving picture to the viewer's left eye,
   the optical density of one of said light transmitting means being at least 0.3 darker than the optical density of the other light transmitting means, whereby one eye perceives a darker image than the other eye,
   the darker light transmitting means having a spectral density gradient with a substantially higher transmissivity in the blue region than in the green or yellow regions, and
   means for holding said light transmitting means in place on a viewer's face.

15. The viewer glasses of claim 14, said first and second light transmitting means comprising respective lenses.

16. The viewer glasses of claim 15, wherein the lighter lens has a relatively light central portion and a relatively dark peripheral portion, and the darker lens has a peripheral portion, said peripheral portions being generally outside the viewer's direct field of vision when viewing the moving picture.

17. The viewer glasses of claim 14, wherein the difference in optical density between the two light transmitting means is within the range of approximately 0.8 to approximately 2.0.

18. The viewer glasses of claim 14, wherein the ratio of the darker light transmitting means' optical density in the green-yellow region is within the range of about 1.5–4 times its optical density in the blue region.

19. The viewer glasses of claim 14, wherein the darker light transmitting means has a substantially higher transmissivity in the red region than in the green or yellow regions.

20. A method of creating a stereoscopic effect, comprising:
   transmitting an image of a scene which includes lateral movement to one eye of a viewer, and
   transmitting a darker image of the same scene to the viewer's other eye through a light filter which has a spectral density gradient with a substantially higher transmissivity in the blue region than in the green or yellow regions.

21. The method of claim 20, wherein the image transmitted to one eye has an optical density at least 0.3 darker than the optical density of the image transmitted to the other eye.

22. The method of claim 21, wherein the difference between the optical densities of the images transmitted to each eye is within the range of approximately 0.8 to approximately 2.0.

23. The method of claim 20, wherein the ratio of the light filter's optical density in the green-yelow region is within the range of about 1.5–4 times its optical density in the blue region.

24. The method of claim 20, wherein the light filter has a substantially higher transmissivity in the red region than in the green or yellow regions.

* * * * *